United States Patent
Zhang et al.

(10) Patent No.: US 11,456,631 B2
(45) Date of Patent: Sep. 27, 2022

(54) DISC-TYPE THREE-DEGREE-OF-FREEDOM MAGNETIC SUSPENSION SWITCHED RELUCTANCE MOTOR

(71) Applicant: HUAIYIN INSTITUTE OF TECHNOLOGY, Huaian (CN)

(72) Inventors: Tao Zhang, Huaian (CN); Xinfeng Liu, Huaian (CN); Yeqing Wang, Huaian (CN); Wei Ni, Huaian (CN); Yingjun Sang, Huaian (CN); Xing Xia, Huaian (CN); Weihong Ding, Huaian (CN)

(73) Assignee: HUAIYIN INSTITUTE OF TECHNOLOGY, Huaian (CN)

( * ) Notice: Subject to any disclaimer, the term of this patent is extended or adjusted under 35 U.S.C. 154(b) by 86 days.

(21) Appl. No.: 17/256,809

(22) PCT Filed: Jun. 14, 2019

(86) PCT No.: PCT/CN2019/091316
§ 371 (c)(1),
(2) Date: Dec. 29, 2020

(87) PCT Pub. No.: WO2020/001291
PCT Pub. Date: Jan. 2, 2020

(65) Prior Publication Data
US 2021/0288530 A1    Sep. 16, 2021

(30) Foreign Application Priority Data
Jun. 30, 2018    (CN) .......................... 201810702168.5

(51) Int. Cl.
H02K 7/09    (2006.01)
H02K 1/24    (2006.01)
(Continued)

(52) U.S. Cl.
CPC ............. *H02K 1/246* (2013.01); *H02K 1/146* (2013.01); *H02K 1/17* (2013.01); *H02K 16/02* (2013.01);
(Continued)

(58) Field of Classification Search
CPC ............................ H02K 7/09; H02K 2201/18
See application file for complete search history.

(56) References Cited

U.S. PATENT DOCUMENTS 11,303,191 B2 *    4/2022    Zhang .................... H02K 1/146
11,323,007 B2 *    5/2022    Zhang ................. F16C 32/0465
(Continued)

FOREIGN PATENT DOCUMENTS

CN    102306995 A    1/2012
CN    104265761 A    1/2015
(Continued)

OTHER PUBLICATIONS

Office Action issued in corresponding Chinese Application No. 201810702168.5, dated Oct. 9, 2019; 12 pgs.
(Continued)

*Primary Examiner* — Dang D Le
(74) *Attorney, Agent, or Firm* — Hauptman Ham, LLP

(57) ABSTRACT

A disc-type three-degree-of-freedom magnetic suspension switched reluctance motor includes a stator and a double-disc rotor. The stator includes an axial stator core, a permanent magnet ring, and a radial stator core coaxially connected to each other in sequence from outside to inside. Axial suspension teeth are distributed on two axial ends of the axial stator core, several axial torque teeth are evenly distributed between adjacent axial suspension teeth by axial magnetic isolation blocks, and axial suspension windings and axial torque windings are respectively wound on the axial suspension teeth and the axial torque teeth. Radial (Continued)

suspension teeth are distributed on the inner circumference of the radial stator core, radial torque teeth are evenly distributed between adjacent radial suspension teeth by a radial magnetic isolation block, and a radial suspension winding and a radial torque winding are respectively wound on the radial suspension teeth and the radial torque teeth.

3 Claims, 2 Drawing Sheets

(51) Int. Cl.
    *H02K 1/14* (2006.01)
    *H02K 1/17* (2006.01)
    *H02K 16/02* (2006.01)

(52) U.S. Cl.
    CPC ..... *H02K 2201/12* (2013.01); *H02K 2201/18* (2013.01); *H02K 2213/03* (2013.01)

(56) References Cited

U.S. PATENT DOCUMENTS

| | | | |
|---|---|---|---|
| 2003/0057784 A1* | 3/2003 | Kanebako | F16C 32/0459 310/90.5 |
| 2009/0079284 A1* | 3/2009 | Onuma | F16C 32/0465 310/90.5 |

FOREIGN PATENT DOCUMENTS

| | | |
|---|---|---|
| CN | 106981966 A | 7/2017 |
| CN | 108809023 A | 11/2018 |

OTHER PUBLICATIONS

First Search Report issued in corresponding Chinese Application No. 201810702168.5, dated Sep. 25, 2019; 2 pgs (in English only).
International Search Report issued in corresponding International Application No. PCT/CN2019/091316; dated Aug. 21, 2019; State Intellectual Property Office of the P.R. China, Beijing, China, 5 pgs.
Written Opinion issued in corresponding International Application No. No. PCT/CN2019/091316; dated Aug. 21, 2019; State Intellectual Property Office of the P.R. China, Beijing, China, 8 pgs.

* cited by examiner

DISC-TYPE THREE-DEGREE-OF-FREEDOM MAGNETIC SUSPENSION SWITCHED RELUCTANCE MOTOR

RELATED APPLICATIONS

The present application is a National Phase of International Application Number PCT/CN2019/091316 filed Jun. 14, 2019 and claims priority to Chinese Application Number 201810702168.5 filed Jun. 30, 2018.

TECHNICAL FIELD

The present invention relates to the technical field of bearingless magnetic suspension motors, and in particular, to a disc-type three-degree-of-freedom magnetic suspension switched reluctance motor.

BACKGROUND

A bearingless motor has the advantages of no friction and wear, and no needs for lubrication and sealing, easily achieves operation at a higher rotating speed and a higher power, and has broad application prospects in the fields such as aerospace, turbo molecular pumps, flywheel energy storage, sealed pumps, and high-speed motorized spindles. The bearingless motor are mainly divided into three types, i.e., a bearingless asynchronous (induction) motor, a bearingless permanent magnet synchronous motor, and a bearingless switched reluctance motor. In particular, the bearingless switched reluctance motor has the advantages such as a simple structure, high mechanical strength, flexible control, good fault-tolerance, and good robustness, and has broad application prospects in the fields such as electric automobiles, general industries, and household appliances.

In order to achieve stable suspension of a rotor of the bearingless switched reluctance motor, active control forces are necessarily simultaneously applied on radial four-degree-of-freedom and axial one-degree-of-freedom. The conventional five-degree-of-freedom bearingless switched reluctance motor generally includes the following three structures:

1. consisting of one axial magnetic bearing and two two-degree-of-freedom bearingless switched reluctance motors;
2. consisting of one axial magnetic bearing, one radial magnetic bearing, and one two-degree-of-freedom bearingless switched reluctance motor;
3. consisting of one three-degree-of-freedom radial-axial magnetic bearing and one bearingless switched reluctance motor;

The axial magnetic bearing is separately required in the three structures, an axial length of a system is increased, a critical rotating speed of the system is reduced, and further increases of the rotating speed and power are limited; moreover, two sets of windings are wound on each stator tooth of the conventional bearingless switched reluctance motor, i.e., a suspension winding and a torque winding, and the number of pole pairs of the two sets of windings necessarily satisfies the relationship of plus or minus one; by means of coordination control of torque winding and suspension winding currents, both torque and suspension forces are generated, and strong coupling exists between torque control and suspension control.

SUMMARY

The purpose of the present invention is to provide a disc-type three-degree-of-freedom magnetic suspension switched reluctance motor which is small in size, light in weight, and compact in structure, and to provide a new solution for special electric drive.

The present invention is implemented by means of the following technical solution:

A disc-type three-degree-of-freedom magnetic suspension switched reluctance motor, including a stator and a double-disc rotor, where the stator includes an axial stator core, a permanent magnet ring, and a radial stator core which are coaxially connected to each other in sequence from outside to inside; several axial suspension teeth are evenly distributed on two axial ends of the axial stator core, end surfaces of the axial stator core between adjacent axial suspension teeth are connected to axial magnetic isolation blocks, several axial torque teeth are evenly distributed on the axial magnetic isolation blocks, and axial suspension windings and axial torque windings are respectively wound on the axial suspension teeth and the axial torque teeth; several radial suspension teeth are evenly distributed on the inner circumference of the radial stator core, the inner circumference of the radial stator core between adjacent radial suspension teeth is connected to a radial magnetic isolation block, several radial torque teeth are evenly distributed on the radial magnetic isolation block, and a radial suspension winding and a radial torque winding are respectively wound on the radial suspension teeth and the radial torque teeth; the double-disc rotor consists of a rotor core and disc rotors respectively coaxially connected to two ends of the rotor core, the rotor core is coaxially connected to a rotating shaft extending out of the outer ends of the disc rotors, the inner ends of the disc rotors are provided with axial rotor teeth directly facing the axial stator core, the rotor core penetrates through a stator, and the middle portion of the rotor core is provided with radial rotor teeth directly facing the radial stator core.

The further solution of the present invention is: the tooth width of the axial suspension tooth is greater than the tooth width of the axial torque tooth and the pole pitch of the motor; the tooth width of the radial suspension tooth is greater than the tooth width of the radial torque tooth and the pole pitch of the motor.

The further solution of the present invention is: the permanent magnet ring is made of a rare earth permanent magnet or a ferrite permanent magnet.

Compared with the prior art, the advantages of the present invention are that:

One permanent magnet ring which is located between the axial stator core and the radial stator core and magnetizing radially provides a bias magnetic flux; the axial suspension winding is energized to generate an axial suspension control magnetic flux, the radial suspension winding is energized to generate a radial suspension control magnetic flux, and the radial suspension control magnetic flux and the axial suspension magnetic flux respectively interact with the bias magnetic flux to generate suspension forces enabling stable radial and axial suspension of the rotor; a reluctance torque generated by energizing the radial torque winding and a reluctance torque generated by energizing the axial torque winding are composited into a motor torque. Compared with a bearingless switched reluctance motor of which each stator tooth is provided with two sets of windings, the suspension control and torque control are independent from each other and are simple in control, and are easily achieved; compared with a three-degree-of-freedom bearingless switched reluctance motor consisting of one axial magnetic bearing and one two-degree-of-freedom bearingless switched reluctance motor, the axial length is shorter, and operation at a higher speed and higher power can be achieved, moreover, less displacement sensors are required, less drive circuits are required, and hardware of a control system is simple.

DETAILED DESCRIPTION

Figure 1:
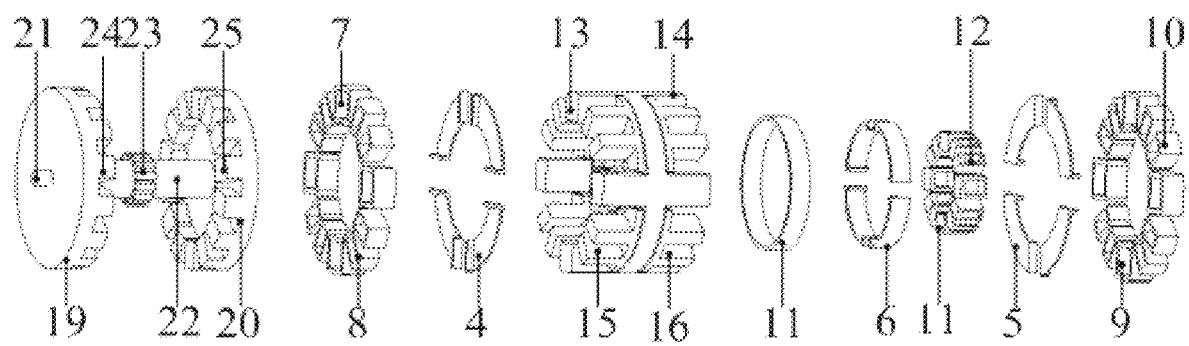
FIG. 1 is an explosive view of the present invention.
Figure 2:
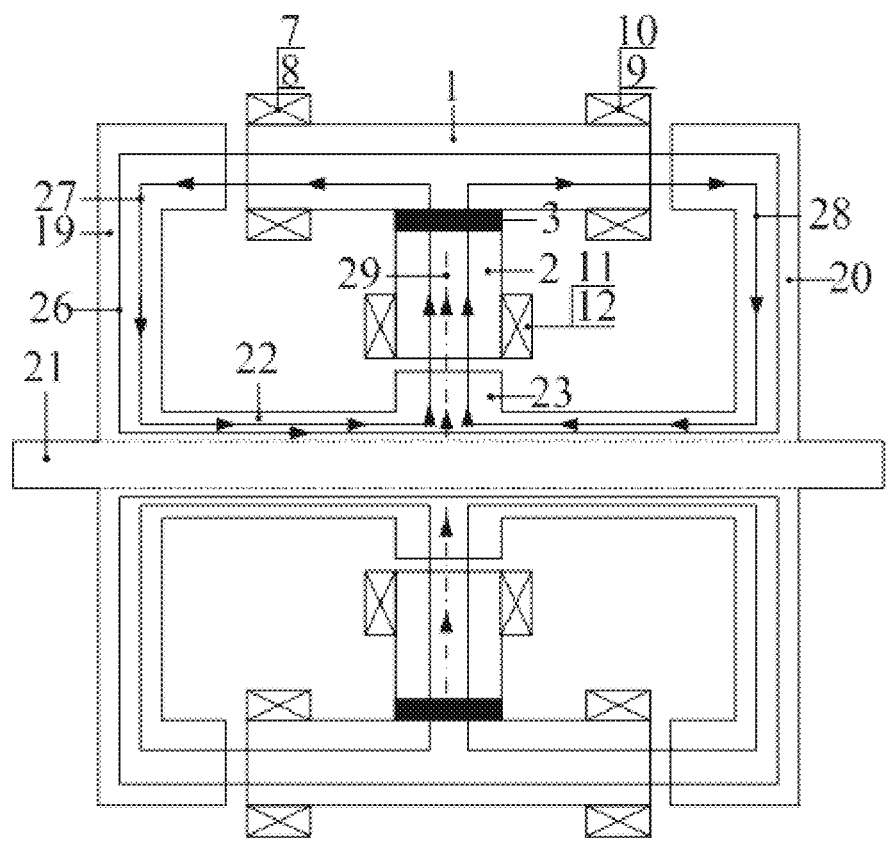
FIG. 2 is a schematic diagram of a front view cross section and a magnetic flux of the present invention.
Figure 3:
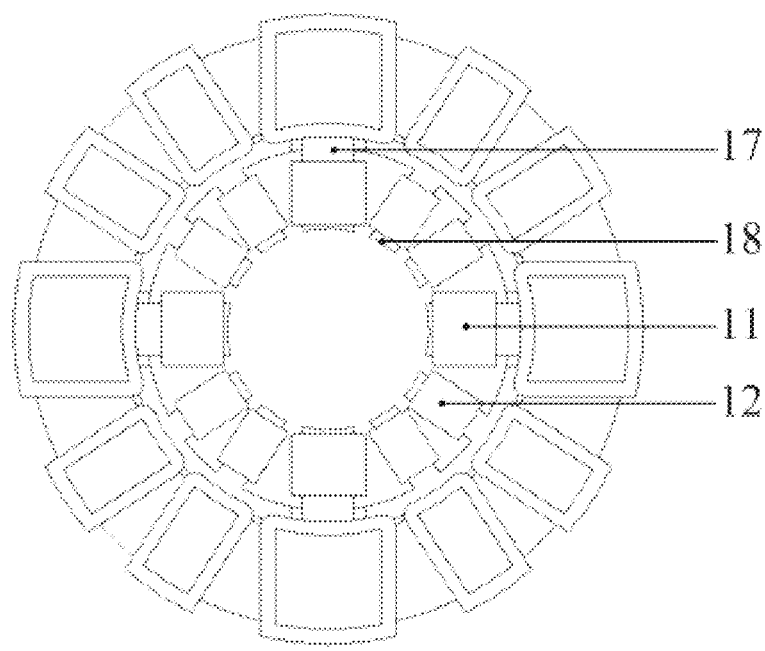
FIG. 3 is a left view of a radial core of the present invention.
Figure 4:
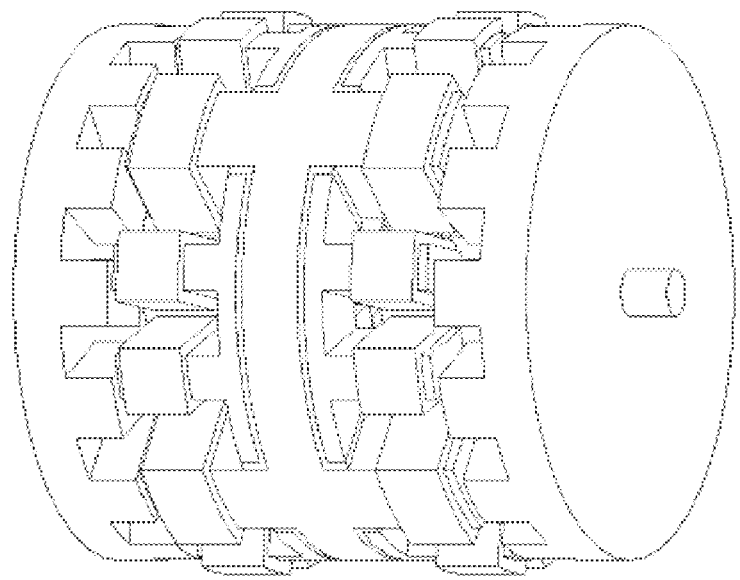
FIG. 4 is a schematic diagram of a three-dimensional structure of the present invention.

A disc-type three-degree-of-freedom magnetic suspension switched reluctance motor as shown in FIGS. 1-4, taking both the ratio of the number of axial stator teeth to the number of axial rotor teeth and the ratio of the number of radial stator tooth to the number of radial rotor teeth being 12:14 as an example, a stator and a double-disc rotor are included, and the stator includes an axial stator core 1, a permanent magnet ring 3, and a radial stator core 2 which are coaxially connected to each other in sequence from outside to inside. Four left axial suspension teeth 13 and right axial suspension teeth 14 located in an x-direction and a y-direction and extending axially are evenly distributed on axial left and right ends of the axial stator core 1, a left end surface of the axial stator core 1 between adjacent left axial suspension teeth 13 and a right end surface of the axial stator core 1 between adjacent right axial suspension teeth 14 are respectively connected to a left axial magnetic isolation block 4 and a right axial magnetic isolation block 5 which are made of aluminum, two left axial torque teeth 15 and right axial torque teeth 16 are respectively evenly distributed on each left axial magnetic isolation block 4 and each right axial magnetic isolation block 5, the tooth widths of the left axial suspension tooth 13 and the right axial suspension tooth 14 are greater than the tooth widths of the left axial torque tooth 15 and the right axial torque tooth 16, and the tooth widths of the left axial suspension tooth 13 and the right axial suspension tooth 14 are greater than one pole pitch of the motor. Left axial suspension windings 7, right axial suspension windings 9, left axial torque windings 8, and right axial torque windings 10 are respectively wound on the left axial suspension tooth 13, the right axial suspension tooth 14, the left axial torque teeth 15, and the right axial torque teeth 16. Four radial suspension teeth 17 located in the x-direction and y-direction are evenly distributed on the inner circumference of the radial stator core 2, the inner circumference of the radial stator core 2 between adjacent radial suspension teeth 17 is connected to a radial magnetic isolation block 6, two radial torque teeth 18 are evenly distributed on the radial magnetic isolation block, the tooth width of the radial suspension tooth 17 is greater than the tooth width of the radial torque tooth 18 and the pole pitch of the motor, a radial suspension windings 11 and a radial torque winding 12 are respectively wound on the radial suspension teeth 17 and the radial torque teeth 18, the left axial suspension windings 7, right axial suspension windings 9, left axial torque windings 8, right axial torque windings 10, radial suspension windings 11, and radial torque windings 12 are centralized windings, which are formed by winding electromagnetic coils having good conductivity and then impregnating with paint and drying. The double-disc rotor consists of a rotor core 22 and a left disc rotor 19 and a right disc rotor 20 respectively coaxially connected to left and right ends of the rotor core 22, the rotor core 22 is coaxially connected to a rotating shaft 21 extending out of the outer ends of the left disc rotor 19 and the right disc rotor 20, fourteen left axial rotor teeth 24 and right axial rotor teeth 25 directly facing the axial stator core 1 are respectively evenly distributed on the edges of the inner ends of the left disc rotor 19 and the right disc rotor 20. The rotor core 22 penetrates through the stator, and the middle portion of the rotor core is provided with radial rotor teeth 23 directly facing the radial stator core 2.

The permanent magnet ring 3 is made of a rare earth permanent magnet or a ferrite permanent magnet, and the axial stator core 1, the radial stator core 2, the left disc rotor 19, the right disc rotor 20, and the rotor core 22 are made of materials having good magnetic conductivity.

The principle of three-degree-of-freedom suspension is: the permanent magnet ring 3 generates a left bias magnetic flux 27 and a right bias magnetic flux 28 without passing through the left axial torque teeth 15, the right axial torque teeth 16, and the radial torque tooth 18, where the left bias magnetic flux 27 starts from the N-pole of the permanent magnet ring 3, passes through the left axial suspension teeth 13, a left axial air gap, and enters, from the left axial rotor teeth 24, into the left disc rotor 19, the rotor core 22, the radial rotor teeth 23, a radial air gap, and the radial suspension teeth 17, and then returns to the S-pole of the permanent magnet ring 3 to form a left closed path. The right bias magnetic flux 28 starts from the N-pole of the permanent magnet ring 3, passes through the right axial suspension teeth 14, a right axial air gap, and enters, from the right axial rotor teeth 25, into the right disc rotor 20, the rotor core 22, the radial rotor teeth 23, the radial air gap, and the radial suspension teeth 17, and then returns to the S-pole of the permanent magnet ring 3 to form a right closed path.

The left axial suspension windings 7 and the right axial suspension windings 9 are connected in parallel or in series in the same direction, and are energized to generate an axial suspension control magnetic flux 26, the radial suspension winding 11 is energized to generate a radial suspension control magnetic flux 29, and the radial suspension control magnetic flux 29 and the axial suspension magnetic flux 26 respectively interact with the left bias magnetic flux 27 and the right bias magnetic flux 28 to generate suspension forces enabling stable radial and axial suspension of the rotor. According to the prior art, displacement sensors are respectively mounted on an axial stator and a radial stator to establish a displacement closed loop system. When the rotor offsets axial and radial balance positions, by means of a displacement negative feedback, the current values of the axial suspension windings and the radial suspension winding are adjusted to generate suspension forces enabling the rotor to return to the balance positions, so as to achieve the stable axial and radial suspension of the rotor.

A rotation principle is that: the number of the radial torque teeth 18, the left axial torque teeth 15, the right axial torque teeth 16, the left axial rotor teeth 24, and the right axial rotor teeth 25 and reversing frequencies of torque windings are determined according to a principle that a radial pole pitch of the motor is equal to an axial pole pitch, the left axial torque windings 8, the right axial torque windings 10, and the radial torque windings 12 are divided into a multi-phase structure, each phase is connected in parallel or in series in the same direction, and the rotation of the motor is achieved by means of reluctance torques generated by energizing each phase of torque windings in turns.

The invention claimed is:

1. A disc-type three-degree-of-freedom magnetic suspension switched reluctance motor, comprising a stator and a double-disc rotor, wherein the stator comprises an axial stator core, a permanent magnet ring, and a radial stator core which are coaxially connected to each other in sequence from outside to inside; several axial suspension teeth are evenly distributed on two axial ends of the axial stator core, end surfaces of the axial stator core between adjacent axial suspension teeth are connected to axial magnetic isolation blocks, several axial torque teeth are evenly distributed on the axial magnetic isolation blocks, and axial suspension windings and axial torque windings are respectively wound on the axial suspension teeth and the axial torque teeth; several radial suspension teeth are evenly distributed on the inner circumference of the radial stator core, the inner circumference of the radial stator core between adjacent radial suspension teeth is connected to a radial magnetic isolation block, several radial torque teeth are evenly distributed on the radial magnetic isolation block, and a radial suspension winding and a radial torque winding are respectively wound on the radial suspension teeth and the radial torque teeth; the double-disc rotor consists of a rotor core and disc rotors respectively coaxially connected to two ends of the rotor core, the rotor core is coaxially connected to a rotating shaft extending out of the outer ends of the disc rotors, the inner ends of the disc rotors are provided with axial rotor teeth directly facing the axial stator core, the rotor core penetrates through the stator, and the middle portion of the rotor core is provided with radial rotor teeth directly facing the radial stator core.

2. The disc-type three-degree-of-freedom magnetic suspension switched reluctance motor according to claim 1, wherein the tooth width of the axial suspension tooth is greater than the tooth width of the axial torque tooth and the pole pitch of the motor; and the tooth width of the radial suspension tooth is greater than the tooth width of the radial torque tooth and the pole pitch of the motor.

3. The disc-type three-degree-of-freedom magnetic suspension switched reluctance motor according to claim 1, wherein the permanent magnet ring is made of a rare earth permanent magnet or a ferrite permanent magnet.

* * * * *